(12) United States Patent
Ducret

(10) Patent No.: US 9,136,677 B2
(45) Date of Patent: Sep. 15, 2015

(54) FLUSH CUT TOOL

(76) Inventor: Lucien C. Ducret, Stanford, CT (US)

( * ) Notice: Subject to any disclaimer, the term of this patent is extended or adjusted under 35 U.S.C. 154(b) by 0 days.

(21) Appl. No.: 12/453,706

(22) Filed: May 20, 2009

(65) Prior Publication Data

US 2011/0083539 A1    Apr. 14, 2011

(51) Int. Cl.
 B23D 21/06   (2006.01)
 H02G 1/12    (2006.01)

(52) U.S. Cl.
 CPC ........... *H02G 1/1297* (2013.01); *H02G 1/1224* (2013.01); *H02G 1/1236* (2013.01); *Y10T 83/656* (2015.04)

(58) Field of Classification Search
 USPC ........... 30/96, 98, 99, 95, 102, 94, 92, 93, 97; 82/78, 83
 See application file for complete search history.

(56) References Cited

U.S. PATENT DOCUMENTS

| | | | |
|---|---|---|---|
| 823,796 A * | 6/1906 | Leyes ................................ | 30/95 |
| 1,310,957 A * | 7/1919 | Nonneman ........................ | 30/98 |
| 2,518,074 A * | 8/1950 | Sauter ............................ | 30/90.2 |
| 2,615,516 A * | 10/1952 | Hyde ............................... | 30/123 |
| 3,431,646 A * | 3/1969 | Young ............................... | 30/97 |
| 3,839,791 A * | 10/1974 | Feamster, III ..................... | 30/97 |
| 3,942,248 A * | 3/1976 | Sherer et al. ...................... | 30/97 |
| 4,146,959 A * | 4/1979 | Hopper ............................. | 30/95 |
| 4,359,820 A * | 11/1982 | Wheeler et al. ................... | 30/97 |
| 4,446,620 A * | 5/1984 | Velte ................................ | 30/96 |
| 4,624,052 A * | 11/1986 | Garcia et al. ...................... | 30/97 |
| 4,845,850 A * | 7/1989 | Rothenberger .................... | 30/96 |
| 6,671,962 B2 * | 1/2004 | Watamura ......................... | 30/96 |
| 7,406,769 B1 * | 8/2008 | Toussaint ......................... | 30/93 |
| 2002/0178587 A1 * | 12/2002 | Watamura ........................ | 30/96 |
| 2007/0180701 A1 * | 8/2007 | Hutt ................................ | 30/95 |
| 2011/0107601 A1 * | 5/2011 | Crainich et al. .................. | 30/95 |

* cited by examiner

*Primary Examiner* — Omar Flores Sanchez

(57) ABSTRACT

A flush cut tool is configured with a support unit operative to hold an armored cable in a desired position. The flush cut tool is further configured with a cutting unit including a hand crank, a blade assembly fixed to the hand crank and a friction assembly. The hand crank is configured to rotate relative to the friction assembly about a pivot axis until the blade assembly is brought in contact with the jacket of the cable. Thereafter, the hand crank, blade assembly and friction unit continue t rotate together about the axis of the cable so that the blade assembly is operative to produce a ring cut.

12 Claims, 5 Drawing Sheets

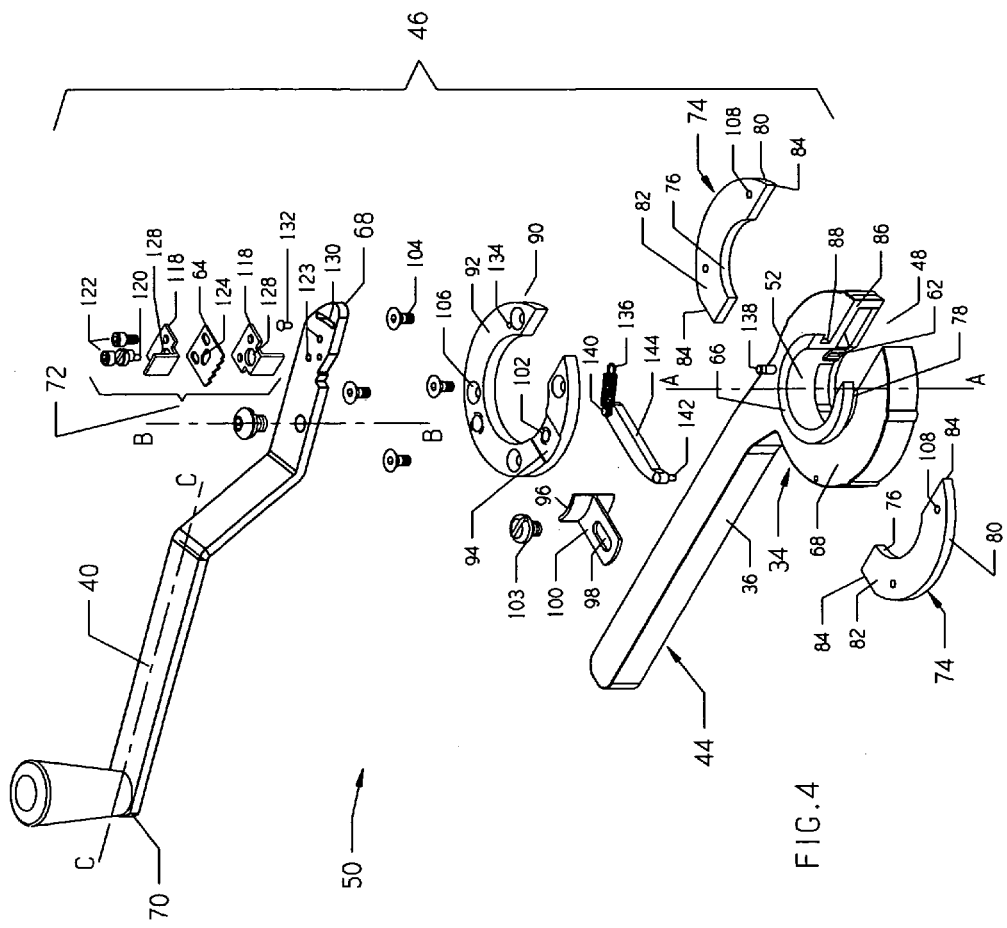

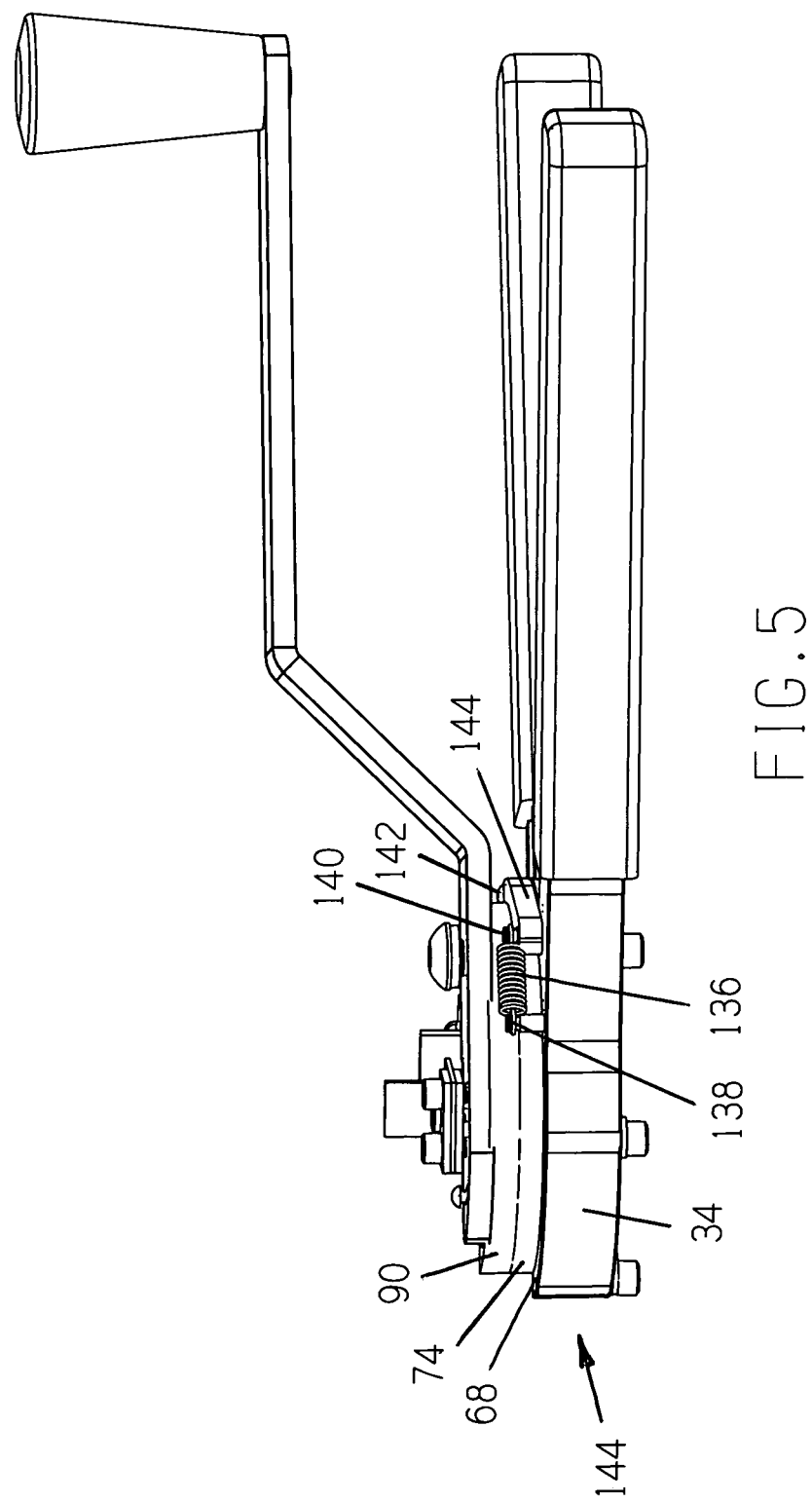

FLUSH CUT TOOL

BACKGROUND OF THE DISCLOSURE

1. Filed of the Disclosure

The disclosure relates to a cutting tool, and in particular to a cutting tool configured to produce a ring cut on the jacket of armored cables.

2. Prior Art

Armored cables are widely used in a variety of industries. Frequently two or more cables have to be coupled together or to the end device. The coupling operation typically involves the cutting and further removal of a jacket. The jacketless end then is inserted into a clamping bushing which, in turn, is fastened to a wiring connecting box.

FIG. 1 illustrates an armored cable 10 provided with a jacket 12 which covers insulation 15 surrounding in turn wires 14. Characteristically, the known prior art cutting tools are typically operative to produce an axial cut forming a spirally shaped edge 20 on a jacket 12 of cable 10, i.e. the edge of remaining jacket 12 extends in a plane which is not perpendicular to the longitudinal axis of cable 10. Furthermore, the spiral edge 20 of jacket typically has a extension 22. Upon insertion of processed cable 10 into the bushing of the end device, due to the spiral edge and extension 22, jacket 12 and the inner face of the bushing are not parallel to one another which leads to the improper position of cable 10 within the bushing.

A need, therefore, exist for a cutting tool configured to produce a ring cut on the jacket of armored cables.

SUMMARY OF THE DISCLOSURE

This need is met by a flush cutting tool configured with a blade assembly which penetrates the shield of the cable to be treated in a controlled circular manner in accordance with the disclosure. The disclosed tool is structured with a clamping unit operative to clamp and center the cable to be processed along its axis of symmetry. The tool further includes the blade assembly provided with multiple blades that can move radially relative to the axis of symmetry to engage the jacket of the cable to be process, and thereafter, move around the jacket while penetrating the jacket at the desired depth.

The blade assembly is actuated by a hand-held crank lever which first rotate about a pivot axis parallel to and spaced from the longitudinal axis so as to radially displace the blades about the longitudinal axis to produce a ring cut all in response to an external torque applied to the hand crank. The clamping unit provides a support for the blade assembly and hand crank by means of a rotary unit having one end coupled to the support surface of the clamping unit and the opposite end operatively coupled to the hand crank. The rotary unit is configured with a spring or drag-induced assembly operative to prevent displacement of the rotary unit until the blade assembly engages the jacket. Once the jacket is engaged, a spring force preventing the rotation of the rotary member is overcome by the applied torque which initiates the rotation of the rotation member along with the hand crank and blades about the longitudinal axis.

The radial displacement of the blades is a result of the initial rotation of the hand crank about a pivot axis which is parallel to and spaced from the longitudinal axis. As long as the applied torque is smaller than the spring force of the spring assembly, the hand crank rotates about the pivot axis and causes the blades to move radially linearly to engage the jacket. Once the latter occurred, the torque overcomes the spring force which actuates the rotary member and blades and crank to rotate about the longitudinal axis and complete the cut.

BRIEF DESCRIPTION OF THE DRAWINGS

The further features of the disclosure will become more readily apparent from the following specific description discussed in conjunction with the accompanying drawings, in which:

FIG. 4 is an exploded view of the disclosed flush cut tool

FIG. 5 is a side view of the disclosed flush cut tool.

SPECIFIC DESCRIPTION

Figure 1:
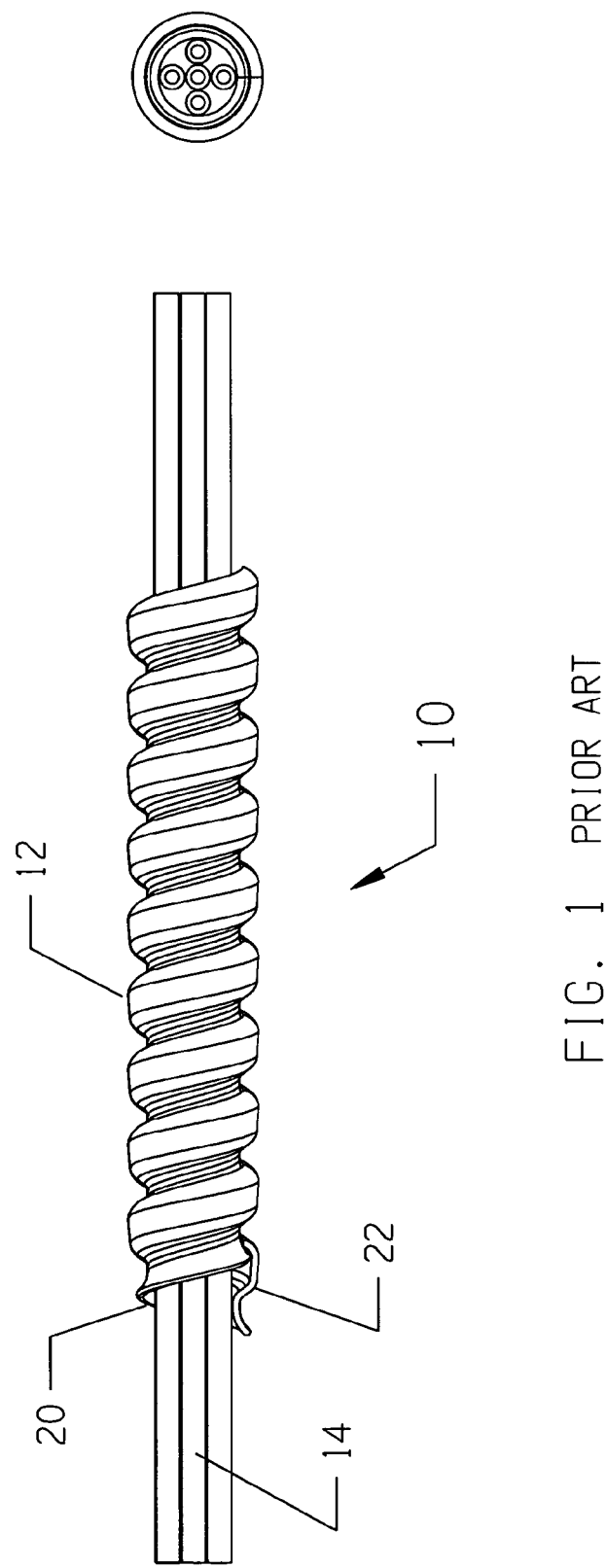
FIG. 1 illustrates an armored cable with a cut produced by the known prior art tolls.

Reference will now be made in detail to the disclosed device. Wherever possible, same or similar reference numerals are used in the drawings and the description to refer to the same or like parts or steps. The drawings are far from precise scale.

Figure 2:
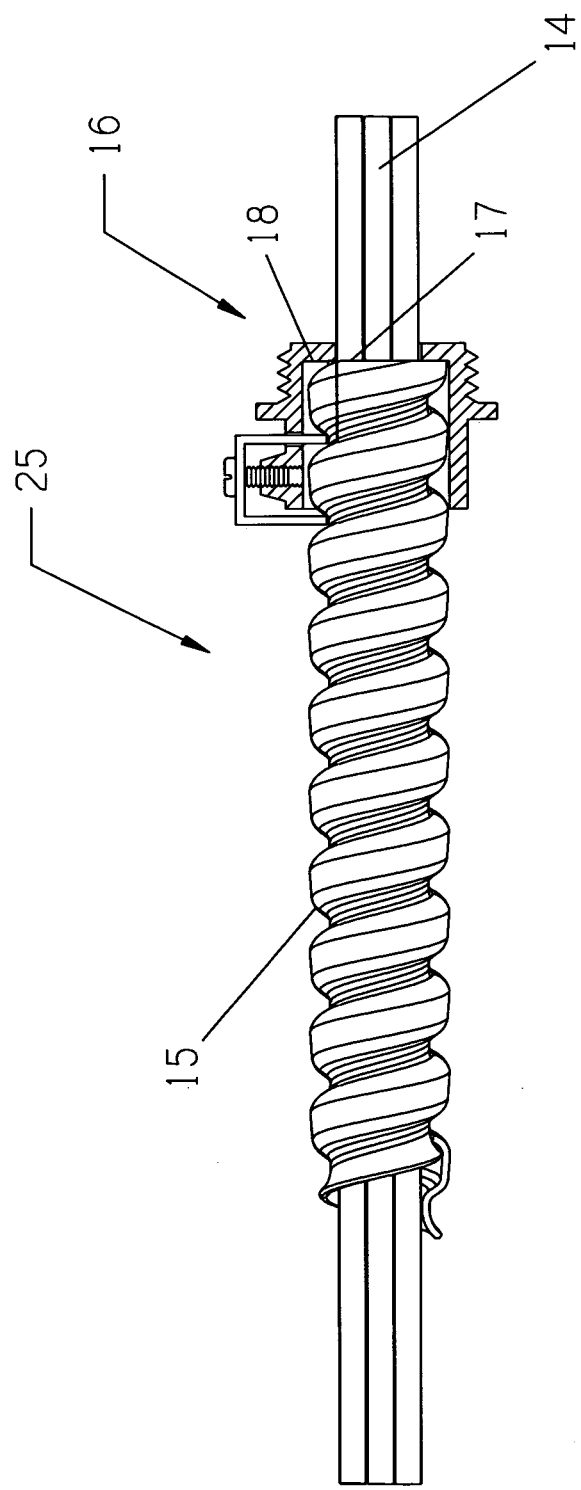
FIG. 2 illustrates the armored cable of FIG. 1 with a ring cut produced by the disclosed flush cut tool.

Referring to FIG. 2, a cut produced on a jacket 15 of an armored cable 25 has a substantially circular end 17. Upon inserting cable 25 into a bushing 16, flush cut end 17 of jacket 15 continuously abuts an inner face 18 of bushing 16 so that end 17 and surface 18 are parallel to one another, obviating, thus, problems of the discussed prior art.

Figure 3:
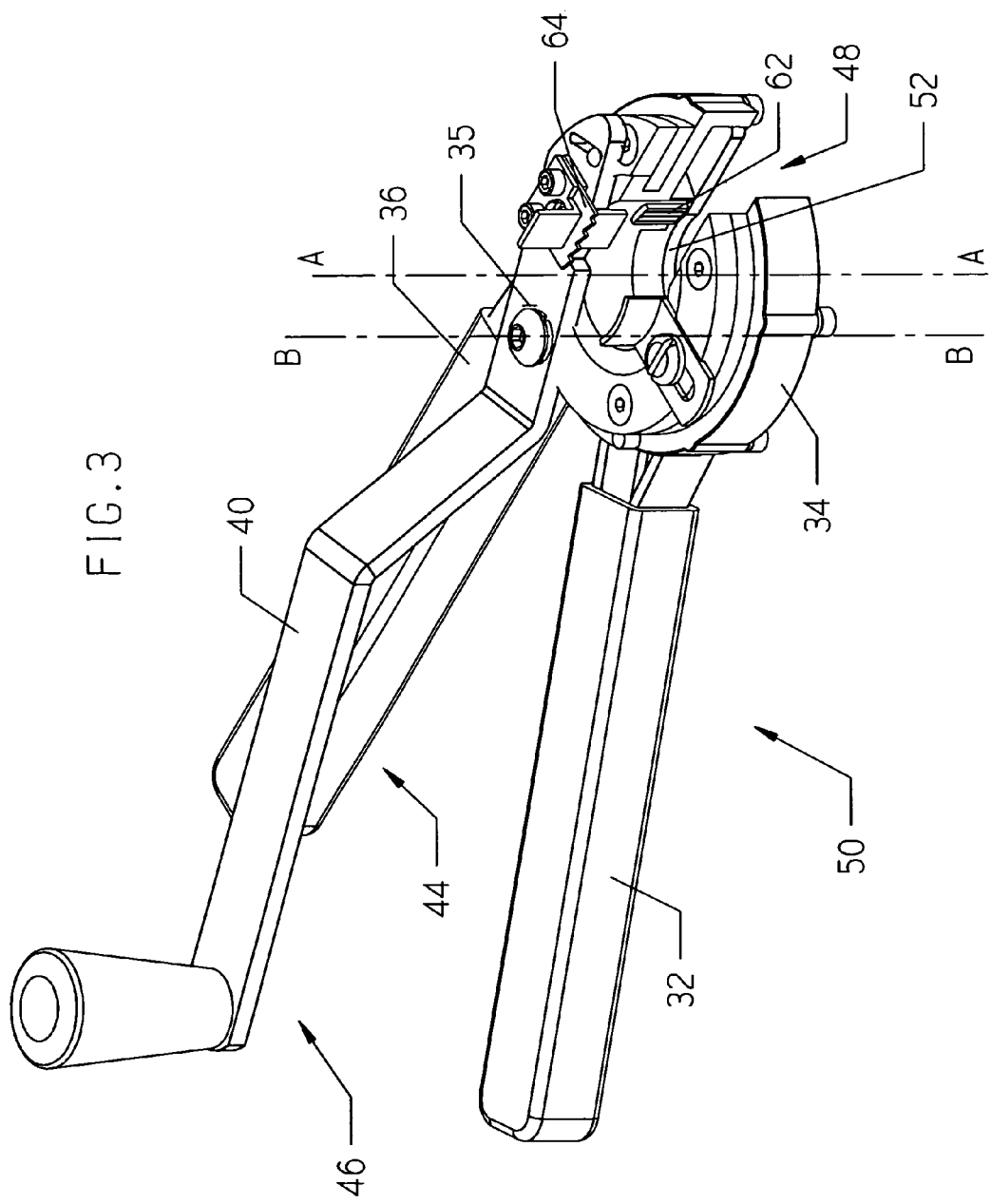
FIG. 3 is a view of the assembled flush cut tool of the present disclosure.

Referring to FIG. 3, a disclosed cutting tool 50 is configured with a support unit 44 and a cutting unit 46 detachably coupled to one another. The units 44 and 46 cooperate with one another to produce the ring cut on jacket 15 of cable 25 of FIG. 2.

In use, the armored cable shown in FIG. 2 is displaced through a passage 48 into a substantially circular space 52 provided in a gripping portion 34 of support unit 44. Upon applying a compressing force to arms 32 and 36 of support unit 44, three gripping jaws 62 thereof close in on the cable which, thus, is reliably center-held in place. Then, in response to a torque applied to a hand crank 40, the latter pivots about a pin 35 on axis B-B and displaces a blade assembly 64 towards the cable's jacket. As crank 40 continues to rotate, blade assembly 64 comes into contact with the cable's jacket and, as discussed below, completes a circular cut in a plane perpendicular to an axis A-A which coincides with the longitudinal axis of the gripped cable.

FIG. 4 is an exploded view of disclosed tool 50 illustrating the structural details helping explain the operation of the tool. The support unit 44 may have numerous configurations all having in common supporting jaws 63 (only one is shown) which are configured to displace relative to one another so as to grip and release, respectively, the cable. Depending on a concrete configuration, supporting jaws each may be coupled detachably or permanently to the respective arms. As readily realized by an artisan, a single arm with two displaceable gripping jaws can be easily configured as well. Common to all configurations of support unit 44 is a flat "stationary" surface 68 of gripping portion 34 provided with an annular flange 66 which has an undercut 88.

The cutting unit 46, in addition to the above disclosed details, is configured with numerous components which are preferably detachably coupled to one another. The component of cutting unit 46 providing engagement thereof to support unit 44 includes two semicircular segments 74. The segments 74 each are placed on surface 68 and have inner radial surfaces 76 which abut outer radial surface 78 of flange 66 upon having radially pushed under undercut 88 of flange 66.

The radial width of web 82 defined between inner and outer radial surfaces 76 and 80, respectively, of each segment 74 is narrower than the radial width of flat surface 68 of support unit 44 for the reasons discussed hereinbelow. The circumferential length of each segment 74 is selected so that, when placed on top surface 68 of support unit 44, one of opposite ends 84 of respective segments 74 lie flush with surfaces 86 defining passage 48. The opposite ends 84 of respective segments 74 are spaced apart at the width of passage 48. On the other hand, the thickness of segments 74 is such that the segments can frictionally slide relative to portion 34 of support unit 44.

The cutting unit 46 further has a split ring 90 coupled to webs 82 of respective segments 74. The split ring 90 is configured with the thickness selected so that its top surface 92 lies radially flush with the top of flange 66 and with the circumferential length corresponding to the length of flange 66 of support unit 44. To ensure that the portion of the cable jacket is prevented from bending during the cut, the top surface 92 of ring 90 has a depression 94 configured to receive a support element 100. The support element 100 has a T-shaped cross-section having a curved plate 96 operative to abut the jacket of the cable upon radially adjusting element 100 relative to axis A-A. Such an adjustment can be realized by providing a prolong slot 98 in either element 100 or depression 94 and a threaded hole 102 in the other of these components. Once the support element 100 is in the desired position, a screw 103 is inserted through slot 98 and hole 102 and further tightened to ensure the desired radial position.

A plurality of screws 104 traverse openings 106 going through split ring 90 and are received in respective threaded holes 108 of each segment 74. Upon tightening screws 104, ring 90 and segments 74 are rotatably fixed to one another.

The elongated hand crank 40 of unit 46 extends along a longitudinal axis C-C and may have a generally step-like shape with proximal and distal end portions 70, 68, respectively, extending in parallel to support element 100 in the assembled state of unit 46. The blade 64 is sandwiched between stop plates 118 and coupled thereto to define a blade assembly 72. The blade 64 and plates 118 can be controllably displaced relative to one another to the desired position corresponding to the thickness of the jacket to be cut. The radial displacement is realized by implementing an eccentric 120 traversing holes 128 in respective plates 118 and a prolong slit 124 in blade 64. The eccentric 120 is configured so that blade 64 can move radially in and out relative to blade clamping screws 122 that, in turn, are received in respective threaded holes 123 of crank 40. Once the desired radial position is reached, screws 122 are tightened.

The distal end portion 68 has an arcuate slot 130 providing a motion guide for a press-fit pin 132 which engages a hole 134 on rotary ring 90. Since crank 40 is pivotal relative to ring 90 and segments 74, pin 132 does not allow the crank and, therefore, blade 64 to uncontrollably rotate, providing an additional safety to the griped cable.

Referring to FIGS. 4 and 5, in addition to the friction generated between segments 74 and portion 34 of support unit 44 during the cutting operation, a spring assembly provided on portion 34 provides additional friction between stationary portion 34 and displaceable parts of cutting unit 46. The spring assembly includes two poles 138 and 142 spaced angularly apart on and coupled to flat surface 68 of stationary portion 34 which is accessible since segments 74 are radially narrower than surface 68. A lever 144 is fixed by one of its opposite ends to pole 142 and by the opposite end to an extension spring 136 with pole 140, which, in turn, has its other end coupled to pole 138. The spring assembly is so configured that spring lever 144 is biased against and, therefore, frictionally slides along outer peripheral surfaces 80 of respective segments 74 as the latter rotate during the cutting operation. Moreover, as the cut is being performed, lever 144 falls twice in between opposite and spaced apart ends 84 of respective segments 74 indicating thus the resting position of hand crank 40. The cut is completed when blade 64 penetrates jacket 15 (FIG. 2) until the fronts of respective parts 118 stops further penetration and jacket 15 is severed.

Although shown and disclosed is what is believed to be the most practical and preferred embodiments, it is apparent that departures from the disclosed configurations and methods will suggest themselves to those skilled in the art and may be used without departing from the spirit and scope of the invention. Accordingly, the present invention is not restricted to the particular constructions described and illustrated, but should be construed to cohere with all modifications that may fall within the scope of the appended claims.

The invention claimed is:

1. A flush cut tool for producing a ring cut through a jacket of an armored cable extending along a longitudinal axis, comprising:
   a support unit operative to clamp and center the cable in a desired position about the longitudinal axis;
   a hand crank coupled to the support unit; and
   a blade assembly coupled to the hand crank and configured with a plurality of angularly spaced blade teeth, the hand crank being pivotal relative to the support unit about a pivot axis parallel to and spaced from the longitudinal axis in response to an external torque so as to radially displace the blade teeth in contact with the jacket in one rotational direction, and thereafter while the applied torque is increased, the hand crank being rotatable along with the blade assembly about the longitudinal axis while the blade unit cuts through the jacket producing a circular cut; and
   a friction unit provided with a spring which has opposite ends coupled to respective support unit and blade assembly and is operable to prevent rotation of the blade assembly until the increased torque exceeds a spring force.

2. The flush cut tool of claim 1, wherein the friction unit is centered on the longitudinal axis, the support unit including a support surface coaxial with the friction unit and being provided with a central annular flange configured to engage the friction assembly.

3. The flush cut tool of claim 2 further comprising two semi-circular segments mounted to the support surface and engaging the central flange so that the segments are operative to frictionally rotate relative to the support surface and central flange about the longitudinal axis as the hand crank and blade assembly rotate about the longitudinal axis in the one direction.

4. The flush cut unit of claim 3 comprising a ring rotationally fixed to and coaxial with the semicircular segments, the ring being coupled to the hand crank so that the hand crank is operative to pivot relative to the ring.

5. The flush cut tool of claim 4, wherein the hand crank extends along an axis of symmetry and is provided with a pin offset laterally from an axis of symmetry and extending along the pivot axis of the hand crank and configured so that the hand crank pivots relative thereto, the pin being removably fixed to the ring.

6. The flush tool of claim 4, wherein the central flange of the support unit has an undercut configured so that the semi-circular segment have respective inner edges thereof sandwiched between the support surface and an inner surface of the flange.

7. The flush tool of claim 6, wherein the central flange defines an annular space, the support surface, the semicircular segments and the ring being configured to define a radial channel running into the annular space and dimensioned to provide a passage for the cable into and out of the annular space.

8. The flush tool of claim 4 further comprising a spring assembly mounted to the support surface and configured to frictionally engage the outer edges of the segments to prevent rotation of the semi-circular segments while a spring force is greater than the external torque and to allow the rotation When the external torque exceeds a spring force, the segments being configured with outer edges terminating radially inwards from an outer periphery of the support surface.

9. The flush tool of claim 8, wherein the spring assembly includes two poles fixed to and extending from the support surface, a lever pivotally mounted to one of the poles by one of opposite ends thereof, and an extension spring braced by opposite ends thereof to the other end of the lever and other pole.

10. The flush tool of claim 4 further comprising a T-shaped bracket removably received in an indentation of the ring and configured to controllably radially move relative to the ring to engage the cable.

11. The flush tool of claim 4, wherein the hand crank has a slit provided on a distal end thereof and a stop extending through the slit and removably fixed to the ring, the slit and stop being configured to limit pivoting of the hand crank.

12. The flush tool of claim 1, wherein the blade assembly includes two stop plates axially aligned with one another, a serrated blade sandwiched between the stop plates, and an eccentric axially extending through the plates and blade teeth, the eccentric being configured to provide the blade teeth with radial displacement.

* * * * *